D. M. DORE.
DEVICE FOR COLORING BUTTER.
APPLICATION FILED MAR. 24, 1915.

1,163,982.

Patented Dec. 14, 1915.

UNITED STATES PATENT OFFICE.

DANIEL M. DORE, OF NEW HAVEN, CONNECTICUT.

DEVICE FOR COLORING BUTTER.

1,163,982.   Specification of Letters Patent.   Patented Dec. 14, 1915.

Application filed March 24, 1915. Serial No. 16,565.

*To all whom it may concern:*

Be it known that I, DANIEL M. DORE, a citizen of the United States, residing at New Haven, in the county of New Haven and State of Connecticut, have invented a new and useful Improvement in Devices for Coloring Butter; and I do hereby declare the following, when taken in connection with the accompanying drawings and the characters of reference marked thereon, to be a full, clear, and exact description of the same, and which said drawings constitute part of this application, and represent, in—

Figure 1:
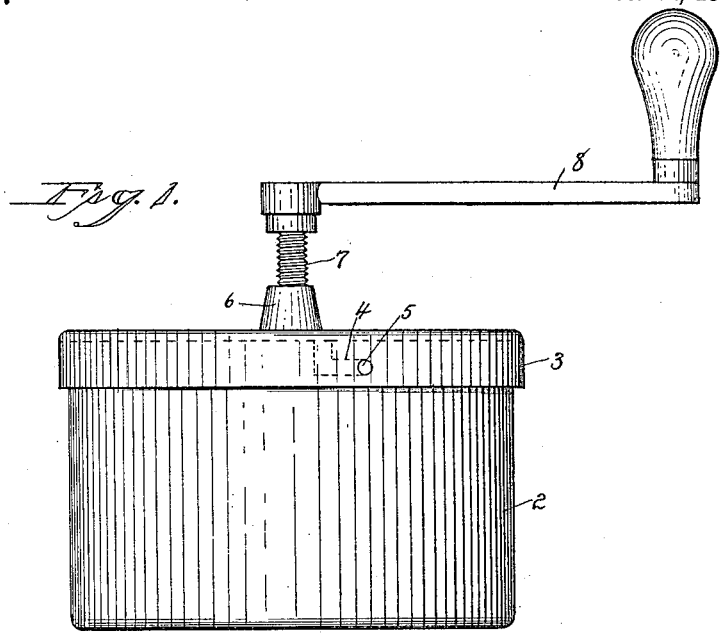
Figure 2:
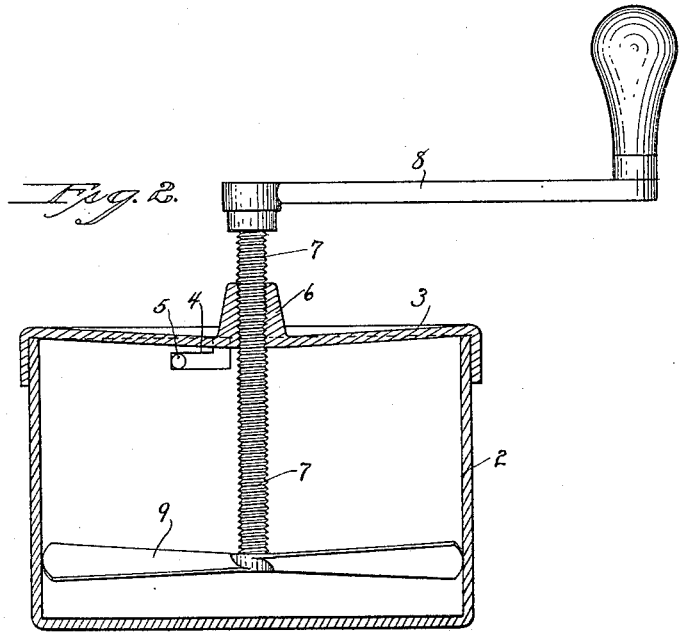

Figure 1 a side view of a device for coloring butter constructed in accordance with my invention. Fig. 2 a vertical sectional view of the same.

This invention relates to an improvement in device for coloring butter or oleomargarin. While the law prohibits the sale of oleomargarin with certain coloring matter, there is no reason why the consumer should not color it, and it is the custom of consumers to so color it.

The object of this invention is to provide a device by which the consumer may conveniently and easily color oleomargarin or butter if desired, and the invention consists in the construction hereinafter described and particularly recited in the claim.

In carrying out my invention I employ a round box or receptacle 2 of the desired size and made from any suitable material. This box is provided with a cover 3 which may be secured to the box in any desired manner. As herein shown the box is provided on opposite sides with bayonet slots 4 and the cover with pins 5 adapted to enter and engage therewith, although it is obvious that any means for locking the cover to the box may be employed. In the center of the cover is a nut 6 and extending through this nut is a threaded spindle 7 provided at its outer end with a crank handle 8. Fixed to the inner end of the screw within the box is a blade 9 the ends of which extend to the walls of the box. This blade is in the form of a propeller blade the pitch of the blades being reversed to the pitch of the screw and as the screw is turned up or down the blade will revolve in the box and work the butter instead of cutting it as would be the case if the pitch of the blade was the same as the pitch of the screw. The butter or oleomargarin to be colored is packed in the box and the coloring matter placed on top. Then the cover is fixed to the box and the handle rotated so as to force the screw downward into the contents of the box. The screw has a slow pitch thread so that the blades make a number of revolutions before reaching the bottom of the box. The screw is then rotated in the opposite direction which draws the blade out of the contents and this operation is repeated as many times as necessary to thoroughly blend the coloring matter with the contents of the box. When the operation has been completed the cover may be removed and the box or container serves as a convenient vessel for keeping the butter or oleomargarin as it can be placed in a refrigerator.

I claim:—

A device for coloring butter comprising a container, a cover adapted to be interlocked therewith, a nut in the center of said cover, a screw extending through said nut, said screw provided at its upper end with a handle, and a propeller blade secured to the inner end of said screw and extending to the wall of the box, the pitch of the blades being the reverse of the pitch of the screw.

In testimony whereof, I have signed this specification in the presence of two subscribing witnesses.

DANIEL M. DORE.

Witnesses:
U. L. SUNDBLAD,
MALCOLM P. NICHOLS.

Copies of this patent may be obtained for five cents each, by addressing the "Commissioner of Patents, Washington, D. C."